Feb. 27, 1968  G. C. CAMENISCH ET AL  3,370,633
NUT CAGE WITH PLUG-IN NUT
Filed Feb. 14, 1966  2 Sheets-Sheet 1

Inventors:
Gian Carl Camenisch
Walter Engelmann
Karl Rosskopf &
Henri Poivet,
by Gordon Guellman Atty.

Feb. 27, 1968     G. C. CAMENISCH ET AL     3,370,633
NUT CAGE WITH PLUG-IN NUT
Filed Feb. 14, 1966                    2 Sheets-Sheet 2
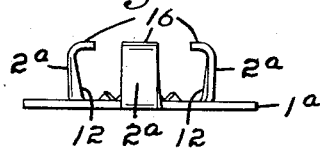
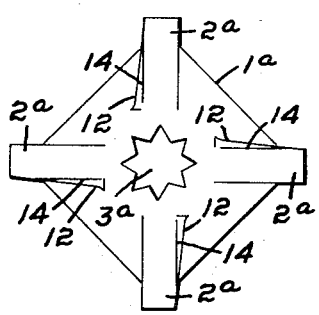
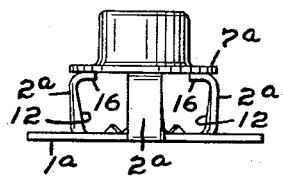
Inventors:
Gian Carl Camenisch
Walter Engelmann
Karl Rosskopf &
Henri Poivet,
by Gordon Yuchman
Atty.

United States Patent Office 3,370,633
Patented Feb. 27, 1968

3,370,633
NUT CAGE WITH PLUG-IN NUT
Gian Carl Camenisch, Lorrach, Baden, Walter Engelmann, Goppingen, and Karl Rosskopf, Lorrach, Baden, Germany, and Henri P. Poivet, St. Martin, d'Heres, Isere, France, assignors to A. Raymond, Baden, Germany, a firm
Filed Feb. 14, 1966, Ser. No. 527,329
Claims priority, application Germany, Feb. 23, 1965, R 39,973; Nov. 16, 1965, R 42,000
1 Claim. (Cl. 151—41.74)

ABSTRACT OF THE DISCLOSURE

This invention is directed at a cage nut having an axial aperture formed in the base of the cage with the base having a series of teeth extending therefrom adapted to engage the threads of a screw or the like, and act as a locking or binding means.

---

The present invention relates generally to fastening devices and more specifically to plug-in nuts for blind assemblies.

An object of the present invention is to provide a plug-in nut for blind attachment to an aperture in a support.

A further object of the present invention is to provide a fastener for blind attachment to a support having means of preventing turning when the fastener is subjected to a rotary torque.

The completion of a screw connection at a support accessible from one side only is rendered particularly difficult, if only a round opening is available for the purpose, offering no possibilities at all to prevent the nut from turning when the screw is being tightened.

The problem, on which the invention is based, is further made more difficult by the fact that if a nut cage with plug-in nut is utilized it must be just as inexpensive as other competitive screw connections, which necessitates mass production and can only be brought about by wide possibilities for application. Therefore, expensive designs are unsuited, and the object of the invention must be directed toward the simplest, functional construction and produceability.

It is prerequisite for reliable functioning of a plug-in nut that any possibility whatsoever of corotation of the nut, inaccessible in its location, should be prevented. This can be achieved in the first place by the obvious, even though unsafe appearing method of sufficiently increasing the static friction and by a clamping resistance beyond the glide resistance in the screw threads to be overcome in the screwing in process.

During the subsequent tightening of the screw, the clamping force of the nut must progressively be increased beyond the increasing tightening, turning moment, in order to complete the screw connection in the intended manner.

While various proposals have already been made along this line, no success has been achieved in finding a satisfactory solution or in countering the increasing turning moment during the tightening process with a sufficiently high clamping force and static friction which would prevent corotation of the nut in a reliable fashion. The problem lies in the fact that the progressive tension exerted on the plug-in nut by the act of tightening the screw must also simultaneously increase its clamping force to a sufficient degree and proportional thereto so that an accompanying increase in the tightening turning moment exerted on the screw to the extent required for a satisfactory connection can be achieved reliably.

A nut cage can be designed to achieve the object of the invention which, firstly, carries the plug-in nut and holds it during and after the attachment in the support hole, secondly, reliably prevents corotation of the plug-in nut, when the screw is turned, by a sufficient clamping effect in the support hole in connection with an optimum static friction and, thirdly, permits the required increase in the clamping force in dependence on and proportional to the tightening turning moment exerted on the screw to be brought about reliably when the screw is subsequently tightened to the required extent.

At the same time, the nut cage according to the invention is to be so designed as to protect the screw connection against backing off or even loosening.

According to the invention, the nut to be employed is designed as a flanged nut whose flange, located at the lower end of the nut, is intended for fastening to the nut cage by means in the first embodiment of several slots, equally spaced and arranged at equal distance from the rim. It is advantageous to arrange, four slots in the flange of the plug-in nut, because this facilitates maintaining its proper position with respect to the screw.

To join the flanged nut to its nut cage, tongues are cut out of the bottom part of the sheet metal cage, depending on the number and arrangement of the slots in the flange of the nut, in such a manner that the points of the tongues extend radially outward. The tongues are then bent up and inward in the direction toward the axis of the center hole, provided for passage of the screw, so that the main direction of the tongues is now oriented at right angles to the base of the nut cage. The tongues, made somewhat narrower, are passed through the slots in the flange, which are dimensioned so as to be matching them and their ends are bent over inward or outward for securing the flanged nut. By virtue of this connection to the suitably dimensioned nut cage, the plug-in nut can be attached in round, blind holes in carriers for the fastening of other objects by means of a screw.

The bottom part of the nut cage which consists of a thin sheet metal is clamped in between a molding and a support and is so dimensioned that a comparably large area for adhesion can be obtained, so that a not inconsiderable portion of the tightening turning moment exerted on the screw, which stimulates the corotation of the nut and of the cage connected to it, can be compensated by static friction.

As long as the screw, when it is screwed in, has to overcome the glide resistance in the screw threads only, the turning moment required is relatively small. For this reason it is fully sufficient, as tests have confirmed, without exception, to generate the counter force needed for the purpose, including the necessary safety factor, by the clamping effect of the outer cutting edges of the tongues pressing with a small spring force against the rim of the hole.

When the turning moment is subsequently increased in tightening the screw, the bottom part of the nut cage is clamped more and more tightly between the molding and the support whereby the nut is held to the cage by virtue of the flange connecton in this phase of the screwing operation.

Provision has been made by appropriate design of the tongues with respect to the material, cross section and, in particular, by external configuration so that the tongue sectors located between the base and flange of the nut deform outward as the tightening of the screw connection progresses. This causes each tongue sector to bend into a loop which makes more and more contact with the rim of the molding hole and hence provides for the clamping action. Finally, the flange also deforms directly above the loops of the tongues shortly before completion of the screw tightening process, which decisively increases the resistance against corotation of the nut in the critical final phase. Of course, it is a precondition that the nut material and the thickness of the flange permit such desired deformation.

To prevent the nut from being pulled too far into the hole by the screw, the rim of the hole in the nut cage intended for passage of the screw is raised from the base plane in direction toward the nut, as a precautionary measure. Where applicable, this further promotes the increase in resistance against corotation of the nut in the final phase of screw tightening. This design of the hole rim has the additional advantage of eliminating the danger of shearing the tongue loops off.

According to the invention, the raised hole rim can also be cut out so as to be toothed, with the intention of improving the arrestment, especially when the points of the teeth are oriented outward. However, the points of the teeth can also protrude inward in order to effect an increase in the turning moment in upscrewing, because this makes the points of the teeth engage the screw threads between screw and nut to a greater degree.

The nut cage is preferably provided with a thin gasket of appropriate plastic or rubber which, under the influence of the pressure exerted on it in the tightening operation, penetrates all crevices, thus sealing the interior of a small molding. In addition, the gasket helps to improve the adhesion of the nut cage.

The invention will be further explained in the following by way of a design example illustrated in the annexed drawing;

FIG. 6 is a side elevation of a variation of the nut cage shown in FIGS. 1, 4 and 5.

FIG. 7 is a top plan view of the plate of the nut cage shown in FIG. 6; and

FIG. 8 is a side elevation of the nut cage shown in FIG. 6 attached to a nut.

Figure 1:
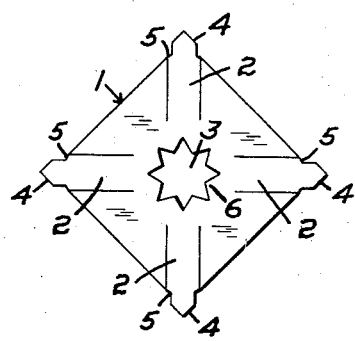
FIG. 1 is a top plan view of the plate of a nut cage according to the invention.
Figure 4:
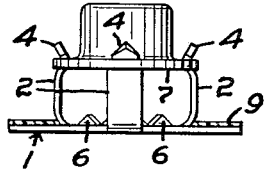
FIG. 4 is a side elevation of the nut cage with plug-in nut inserted and of a gasket.
Figure 5:
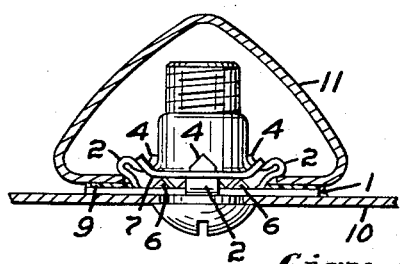
FIG. 5 is a side elevation and partial section of the nut cage with plug nut after screwing a piece of sheet metal to a carrier.

The nut cage as shown in FIG. 4 is made of thin sheet metal. FIG. 1 shows the plate of the cage. It has been cut out of a square piece of sheet metal with little scrap. Out of the square bottom part 1 of the cage four parallel tongues 2 have been cut in direction of the corners, the roots of which are spaced equally from an aperture 3 which is intended for the passage of the screw. Terminal points 4 of the tongues are kept somewhat narrower than the remaining portion of the tongues so that shoulders 5 are formed at both sides, against which the flanged nut is to support itself. The aperture 3 in the plate according to FIG. 1 is not defined by a round rim, but instead has star-shaped teeth as a further development of the invention.

Shapes other than the illustrated square bottom part 1 of the nut cage can be used also. However, the example illustrated has the advantage of offering a large area for engagement and provides the best material utilization as well as providing a geometric arrangement of the four tongues. Moreover, a nut cage having a square bottom part can be positioned closer to edges and corners.

The shape of the cage is shown in FIG. 4 with the rim 6 of the apertures 3 having its teeth raised from the base plane in the direction of the flanged nut to be received. The points of the teeth are, as shown in FIG. 4, oriented inward in order to serve as a lock against loosening of the screw. However, they can also be bent outward in order to improve the clamping action where applicable. A smooth hole rim, raised up, would also meet the requirements of stopping the nut from being drawn too far into the carrier hole and thus preventing the danger of shearing the tongues off.

Figure 2:
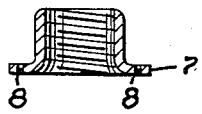
FIG. 2 is a section of a plug-in nut intended for the nut cage.
Figure 3:
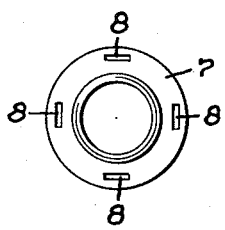
FIG. 3 is a bottom plan view of the plug-in nut according to FIG. 2.

In their main orientation, the four tongues 2 extend perpendicularly upwardly from the plane of the square bottom part 1. Near their roots, the tongues 2 are first shaped slightly outward in order to favor the snapping in and clamping of the nut cage. The middle parts of the tongues 2 stand up perpendicular, with an axial spacing between the tongues slightly larger than the diameter of the carrier hole. The adjacent terminal points 4 of the tongues are first curved inward and then bent up again so that they can be introduced into the slots 8 formed in flange 7 of the plug-in nut as shown in FIGS. 2 and 3. The ends of the points 4 of the tongues protruding from the slots 8 are subsequently bent outward or inward slightly, so that the nut is now secured and can be plugged into an appropriately dimensioned opening for the accomplishment of fastenings. In the event the ends of the points of the tongues are bent outward, care must be taken that this bending is performed to a degree that the ends of the points of the tongues are not perpendicular to the bottom part after completion of the screw connection. For engagement, only slight pressure by hand is required to overcome the spring force of the middle sectors of the tongues 2, until the nut cage snaps in and its bottom part rests against a molding 11.

In is advantageous for a gasket 9 to be arranged on the bottom part 1 of the nut cage, as shown in FIG. 4.

The molding 11 with the nut cage and its gasket 9 can now be positioned over the aperture of the support 10. Screwing in the screw-in presents no difficulties. The screw is sufficiently guided by the aperture 3 so that its thread can immediately engage the thread in the nut. The adhesion of the bottom part 1 which is further improved by the gasket 9 suffices, in conjunction with the clamping force exerted by the two outer edges of each tongue 2 on the rim of the molding hole, to overcome the glide resistance of the screw threads of the nut.

As soon as the screw has been screwed in far enough for it and the nut to exert a pressure on its cage and molding 11 with support 10 to be connected, the tightening phase of the screw begins, which becomes noticeable in a progressive increase in the tightening turning moment. In that stage, the two neighboring walls of the molding and the support will first clamp bottom part 1 tighter and tighter so that the clamping force is sufficiently increased to muster the counter force required for the prevention of the corotation of the cage with the nut. Then, in screwing the screw in further, the tension exerted on the nut increases beyond the carrying capacity of the tongues of the cage, and due to their deformation they bend upwards so that each tongue 2 forms a loop which is flattened more and more as the screw connection nears its completion. Finally, the loops are tightly clamped between the flange of the nut and the rim of the carrier hole, whereby the portions of the flange located over the loops give a little, encompassing the loop-like clamping yokes. Furthermore, the raised rim of the hole 3 in the cage now presses against the nut, which prevents the nut from being screwed in further and the loops of the tongues from being sheared off.

The design example according to the drawing, the rim of the hole in the cage is additionally provided with teeth 6, the points of which are oriented inward. If dimensioned properly, these teeth 6 slide into the gaps of the screw threads between screw and nut shortly before the screw is tightened, thereby increases the turning moment for loosening considerably and a self-locking of the screw connection is accomplished.

Gasket 9 shown in the design example is made of a suitable plastic or rubber and is applied to the bottom part of the cage. It is pushed into all crevices of the slots 8 of the flange, the hole and into the thread by the increasing pressure during the tightening operation, thus sealing the interior of the molding.

Of course, it is possible according to the invention to modify the number of tongues, slots and the like. It is important for the invention that the nut cage is joined to the plug-in nut so as to enable an arrangement which makes a screw connection with a plug-in nut possible, intended for round openings in moldings accessible from one side only, whereby the counter force preventing the corotation of the nut during the tightening operation is generated exclusively by adhesion and clamping of the nut cage as a consequence of the tension itself produced by the tightening turning moment. In further development of the invention, provisions are made for sealing and self-locking of the device.

A variation of the caged plug-in nut is shown in FIGS. 6 through 8. The strip is still utilized as the square bottom part 1a of the nut cage. The tongues 2a are also formed similarly to the tongues 2 but without points. The tongues 2a are bent towards the center of the bottom part 1a, a predetermined distance, thus forming an offset as a bearing surface for a plug-in nut. The nut cage is subsequently spot-welded to the plug-in nut. This arrangement can be engaged with a plug-in nut of any shape, such as a commercially available hex nut. Barbs can also be formed on the tongues to increase the clamping force when it is fastened with a sheet metal molding or the like. The barbs may be formed with a web-shaped configuration. The barbs are passed into the molding and as the turning moment increases they engage the edge of the molding thereby preventing the plug-in nut from rotating due to the clamping effect and static friction.

The variation comprises four tongues 2a, having barbs 12 formed at an edge thereof. That part of the tongues 2a constituting the components forming the barbs 12 is characterized by an impressed reinforcing crease 14. The barb 12 mentioned heretofore is of web-shape to prevent rotation of the plug-in nut after engagement within the hole or aperture of the molding. The tongues 2a have to be formed or bent or set at right angles directly above the bottom part 1a in a substantially parallel relationship thereto, are again bent at right angles toward the center at a predetermined distance along the tongues 2a forming bearing surfaces 16 on which the flange 7a of the barb of the plug-in nut rests. The plug-in nut is then spot-welded at the areas where the bearing surfaces 16 abut the flanges 7a. The bottom part 1a is also provided with an axial aperture 3a having a series of triangular teeth which define the aperture 3a and which guide the threads of a fastening screw by engaging them.

With reference to the foregoing description it is to be understood that what has been disclosed therein represents only a single embodiment of the invention and is to be construed as illustrative rather than restrictive in nature and that the invention is best described by the following claims.

What is claimed is:

1. A fastening device including a nut cage and a nut, said nut cage comprising a base portion having an aperture formed therethrough and a series of tongues extending from said base portion, the tongues being spaced from each other and from the periphery of said base portion, said nut comprising a flange extending radially from the end of a barrel portion, said barrel portion having an axial bore open at both ends, each of the tongues having a free terminal end and said terminal ends attached to the nut portion and the aperture formed in the base portion defined by a series of spaced pointed teeth which are in angular relation to the plane of the base portion and directed inwardly and the bore of the barrel portion being threaded whereby said teeth provide a locking effect by engaging the threads of a bolt and the nut at the axial bore.

References Cited
UNITED STATES PATENTS

| | | | |
|---|---|---|---|
| 1,024,949 | 4/1912 | Munger | 85—71 |
| 1,295,734 | 2/1919 | Greubel | 85—71 |
| 2,171,773 | 9/1939 | Von Mertens | 151—30 |
| 2,376,167 | 5/1945 | Mitchell | 85—71 |
| 2,398,784 | 4/1946 | Gisondi | 151—41.72 |
| 2,401,427 | 6/1946 | Kimbell | 85—71 |
| 2,695,046 | 11/1954 | Tinnerman | 151—30 |
| 2,850,936 | 9/1958 | Poupitch | 85—71 |
| 2,964,989 | 12/1960 | Groessant | 85—71 |

FOREIGN PATENTS

| | | |
|---|---|---|
| 1,240,036 | 7/1960 | France. |

MARION PARSONS, JR., *Primary Examiner.*